United States Patent
Nakahara et al.

(10) Patent No.: US 6,845,069 B2
(45) Date of Patent: Jan. 18, 2005

(54) INFORMATION EDITING APPARATUS, INFORMATION EDITING METHOD, AND INFORMATION RECORDING MEDIUM ON WHICH PROGRAM FOR CONTROLLING EDIT IS RECORDED SO AS TO BE READ BY COMPUTER

(75) Inventors: Masanori Nakahara, Tokorozawa (JP); Takao Sawabe, Tokorozawa (JP); Nobuyuki Takakuwa, Tokorozawa (JP); Masayoshi Yoshida, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 741 days.

(21) Appl. No.: 09/911,395

(22) Filed: Jul. 25, 2001

(65) Prior Publication Data

US 2002/0012304 A1 Jan. 31, 2002

(30) Foreign Application Priority Data

Jul. 26, 2000 (JP) .................................. P2000-225960

(51) Int. Cl.$^7$ .............................................. G11B 7/00
(52) U.S. Cl. .............................. 369/47.13; 369/53.24; 369/59.1; 369/83
(58) Field of Search ....................... 369/47.1, 47.13, 369/53.1, 53.11, 53.2, 53.24, 53.37, 53.41, 53.44, 59.1, 59.24, 83, 84

(56) References Cited

U.S. PATENT DOCUMENTS

| | | | | |
|---|---|---|---|---|
| 5,432,768 A | * | 7/1995 | Terashima et al. | 369/53.24 |
| 6,138,203 A | | 10/2000 | Inokuchi et al. | 711/103 |
| 6,229,777 B1 | * | 5/2001 | Ishitobi et al. | 369/53.2 |

FOREIGN PATENT DOCUMENTS

WO    WO 97/17652 A1    5/1997

OTHER PUBLICATIONS

Japanese Abstract No. 01010481, dated Jan. 13, 1989.
Japanese Abstract No. 02194455, dated Aug. 1, 1990.

* cited by examiner

Primary Examiner—Muhammad Edun
(74) Attorney, Agent, or Firm—Sughrue Mion, PLLC

(57) ABSTRACT

An information editing apparatus for editing recording information already recorded on a write-once recording medium such as DVD-R is provided. In this apparatus, a remaining capacity in the DVD-R is detected. Then, it is determined whether the recording information can be edited or not on the basis of the detected remaining capacity and an amount of information to be recorded in the unrecorded area by editing the recording information. Further, a result of the determination is notified.

28 Claims, 10 Drawing Sheets

FIG. 2

| FORMATION POSITION OF BORDER AREA | CAPACITY OF FIRST BORDER AREA | CAPACITY OF ANOTHER BORDER AREA |
|---|---|---|
| 3D700h~ 9DAFFh | 32 MBYTES (1024 ECC BLOCKS) | 6 MBYTES (192 ECC BLOCKS) |
| 9DB00h~ 1342FFh | 64 MBYTES (2048 ECC BLOCKS) | 12 MBYTES (384 ECC BLOCKS) |
| 134300h~ | 96 MBYTES (3072 ECC BLOCKS) | 18 MBYTES (576 ECC BLOCKS) |

INFORMATION EDITING APPARATUS, INFORMATION EDITING METHOD, AND INFORMATION RECORDING MEDIUM ON WHICH PROGRAM FOR CONTROLLING EDIT IS RECORDED SO AS TO BE READ BY COMPUTER

BACKGROUND OF THE INVENTION

1. Field of the Invention

The present invention relates to a technical field of an information editing apparatus, an information editing method, and an information recording medium on which a program for controlling edit is recorded so as to be read by a computer. More particularly, the invention relates to a technical field of an information editing apparatus and method for editing recording information already recorded on a write-once recording medium, and an information recording medium on which a program for controlling edit is recorded so as to be read by a computer.

2. Description of the Related Art

As the recording density of a recording medium such as an optical disk is increasing in recent years, the recording density of a recording medium on which information can be recorded only once but cannot be overwritten (hereinafter, referred to as a write-once recording medium), such as what is called a DVD-R (DVD-Recordable) is also becoming remarkably higher.

The recording information recorded on the write-once recording medium usually includes not only the recording information itself such as music information or image information to be reproduced but also reproduction control information (generally, also called navigation information) indicative of a reproduction mode, which is specifically a reproduction order of plural recording information, the number of reproduction times, a reproduction range, or the like.

Assuming now that an editing process of deleting all or a part of recording information already recorded on the write-once recording medium, since information can be written only once to the write-once recording medium as described above, the original reproduction control information is not overwritten with the edited reproduction control information but the whole edited reproduction control information is quite separately and newly recorded in an available area at that time.

When the editing process is seen from the user's point of view, however, the available capacity decreases in spite of no newly added recording information. Finally, although any recording information is not additionally increased, the editing process becomes to be impossible.

In this case, a problem occurs such that the user who has repeated the editing process misunderstands or erroneously recognizes the editing process which becomes impossible to be performed as a failure of the information editing apparatus.

Since the editing process becomes impossible to be performed without any information provided, there is also a problem such that an unnecessary and preliminary editing process is repeated and a necessary editing process cannot be executed.

SUMMARY OF THE INVENTION

The present invention has been made in view of the above problems and its object is to provide an information editing apparatus and method capable of preventing the user from erroneously recognizing that the editing process can be performed and capable of allowing a necessary editing process to be effectively executed, and an information recording medium on which a program for controlling edit is recorded so as to be read by a computer.

The above object of the present invention can be achieved by an information editing apparatus of the present invention for editing recording information already recorded on a recording medium on which information can be recorded only once. The apparatus is provided with: a remaining capacity detecting device for detecting a remaining capacity as a recording capacity of an unrecorded area on said recording medium; a determining device for determining whether said recording information can be edited or not on the basis of said detected remaining capacity and an amount of information to be recorded in said unrecorded area by editing said recording information; and a notifying device for notifying a result of said determination.

According to the present invention, since whether the recording information recorded on the write-once recording medium can be edited or not is notified, the user can recognize the state before executing an actual editing process. Consequently, in the case of editing recording information already recorded on the recording medium, the user can be prevented from erroneously recognizing that the information cannot be edited even if a remaining capacity decreases regardless of additionally recording new recording information, and a necessary edit can be effectively executed.

In one aspect of the present invention, said determining device determines the number of times said recording information can be edited after said determination, and said notifying device notifies said determined number of times.

According to this aspect, the user can recognize the specific number of times information can be edited before executing an actual edit.

In another aspect of the present invention, said determining device determines whether said recording information can be edited or not after said determination, and said notifying device notifies whether said recording information can be edited or not.

According to this aspect, the user can therefore recognize whether the information can be edited or not before executing an actual edit.

In further aspect of the present invention, editing of said recording information is deletion of all or a part of said recording information recorded on said recording medium.

According to this aspect, the user can therefore recognize whether recording information can be deleted or not before deleting a part or all of the recording information recorded.

In further aspect of the present invention, said information to be recorded in said unrecorded area including reproduction control information for preventing said deleted recording information from being reproduced.

According to this aspect, the reproduction control information to make the information apparently deleted in the reproduction information after the deleting process is recorded.

The above object of the present invention can be achieved by an information editing method of the present invention of editing recording information already recorded on a recording medium on which information can be recorded only once. The method is provided with: a remaining capacity detecting process of detecting a remaining capacity as a recording capacity of an unrecorded area on said recording medium; a determining process of determining whether said recording information can be edited or not on the basis of said detected remaining capacity and an amount of information to be recorded in said unrecorded area by editing said recording information; and a notifying process of notifying a result of said determination.

According to the present invention, since whether recording information recorded on a write-once recording medium can be edited or not is notified, the user can recognize it before executing an actual edit. Consequently, in the case of editing recording information already recorded on the recording medium, the user can be prevented from erroneously recognizing that the information cannot be edited even if a remaining capacity decreases regardless of additionally recording new recording information, and a necessary edit can be effectively executed.

In one aspect of the present invention, the number of times said recording information can be edited after said determination is determined in said determining process, and said determined number of times is notified in said notifying process.

According to this aspect, the user can therefore recognize the specific number of times information can be edited before executing an actual edit.

In another aspect of the present invention, whether said recording information can be edited or not is determined after said determination in said determining process, and whether said recording information can be edited or not is notified in said notifying process.

According to this aspect, the user can therefore recognize whether the information can be edited or not before executing an actual edit.

In further aspect of the present invention, editing of said recording information is deletion of all or a part of said recording information recorded on said recording medium.

According to this aspect, the user can therefore recognize whether recording information can be deleted or not before deleting a part or all of the recording information recorded.

In further aspect of the present invention, said information to be recorded in said unrecorded area including reproduction control information for preventing said deleted recording information from being reproduced.

According to this aspect, the reproduction control information to make the information apparently deleted in the reproduction information after the deleting process is recorded.

The above object of the present invention can be achieved by an information recording medium of the present invention on which a program for controlling an edit is recorded so as to be read by an editing computer included in an information editing apparatus of editing recording information already recorded on a recording medium on which information can be recorded only once. The program causes said editing computer to function as: a remaining capacity detecting device for detecting a remaining capacity as a recording capacity of an unrecorded area on said recording medium; a determining device for determining whether said recording information can be edited or not on the basis of said detected remaining capacity and an amount of information to be recorded in said unrecorded area by editing said recording information; and a notifying device for notifying a result of said determination.

According to the present invention, since the editing computer is allowed to function to notify of whether recording information recorded on a write-once recording medium can be edited or not, the user can recognize the state before executing an actual edit. Consequently, in the case of editing recording information already recorded on the recording medium, the user can be prevented from erroneously recognizing that the information cannot be edited even if a remaining capacity decreases regardless of additionally recording new recording information, and a necessary edit can be effectively executed.

In one aspect to the present invention, said determining device determine the number of times said recording information can be edited after said determination, and said notifying device notifies said determined number of times.

According to the present invention, the user can therefore recognize the specific number of times information can be edited before executing an actual edit.

In another aspect of the present invention, said determining device determines whether said recording information can be edited or not after said determination, and said notifying device notifies whether said recording information can be edited or not.

According to this aspect, the user can therefore recognize whether the information can be edited or not before executing an actual edit.

In further aspect of the present invention, editing of said recording information is deletion of all or a part of said recording information recorded on said recording medium.

According to the present invention, the user can therefore recognize whether recording information can be deleted or not before deleting a part or all of the recording information recorded.

In further aspect of the present invention, said information to be recorded in said unrecorded area including reproduction control information for preventing said deleted recording information from being reproduced.

According to this aspect, the reproduction control information to make the information apparently deleted in the reproduction information after the deleting process is recorded.

The above object of the present invention can be achieved by a computer data signal of the present invention embodied in a carrier wave and representing a series of instructions which cause a computer to perform steps to execute an editing process in an information editing apparatus of editing recording information already recorded on a recording medium on which information can be recorded only once. The steps are provided with: a remaining capacity detecting step of detecting a remaining capacity as a recording capacity of an unrecorded area on said recording medium; a determining step of determining whether said recording information can be edited or not on the basis of said detected remaining capacity and an amount of information to be recorded in said unrecorded area by editing said recording information; and a notifying step of notifying a result of said determination.

According to the present invention, since the computer is allowed to function to notify of whether recording information recorded on a write-once recording medium can be edited or not, the user can recognize the state before executing an actual edit. Consequently, in the case of editing recording information already recorded on the recording medium, the user can be prevented from erroneously recognizing that the information cannot be edited even if a remaining capacity decreases regardless of additionally recording new recording information, and a necessary edit can be effectively executed.

BRIEF DESCRIPTION OF THE DRAWINGS

FIG. 2 is a diagram showing a concrete example of an information amount of a border-out area;

DETAILED DESCRIPTION OF THE PREFERRED EMBODIMENTS

Preferred embodiments of the invention will be described with reference to the drawings.

Embodiments of the invention relate to an information recording/reproducing apparatus as an information editing apparatus capable of editing recording information already recorded on a DVD-R as a write-once recording medium.

I. Embodiment of Recording Format

Before explaining the embodiment of the information recording/reproducing apparatus, a recording format of a DVD-R as a recording medium according to the embodiment will be described first by referring to FIGS. 1 and 2.

Figure 1:
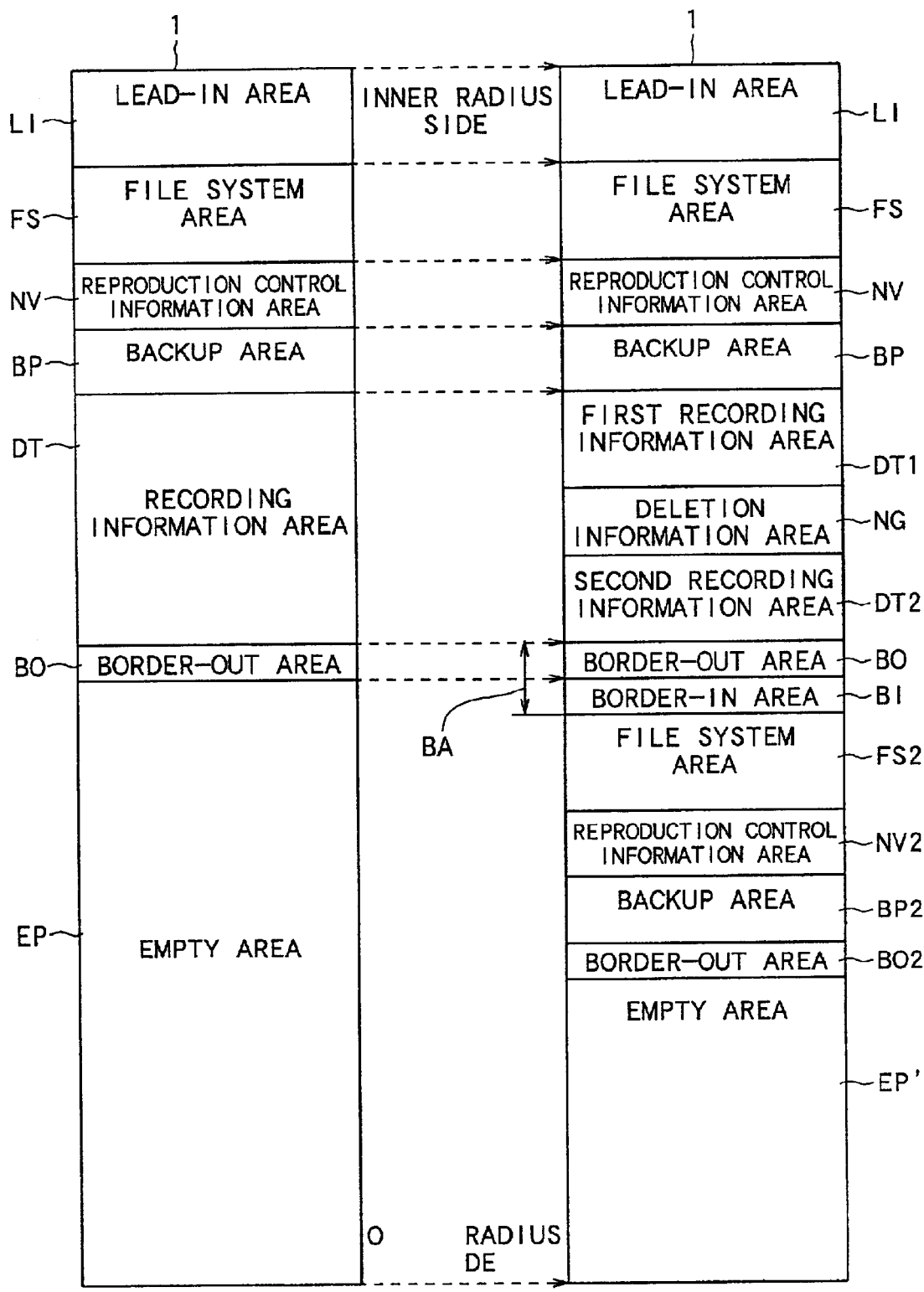
FIG. 1 is a diagram showing a deleting process in a DVD-R 1.

FIG. 1 shows recording formats of recording information recorded on the DVD-R before and after executing an editing process of deleting a part of the recording information already recorded on the DVD-R only once. The left side of FIG. 1 shows the recording format before the editing process is executed, and the right side of FIG. 1 shows the recording format after the editing process is executed. FIG. 2 is a diagram showing a concrete example of an amount of information recorded as a border area which will be described later.

First, as shown in the left side of FIG. 1, after a recording process of recording information onto a DVD-R 1 is executed, a lead-in area LI, a file system area FS, a reproduction control information area NV, a backup area BP, a recording information area DT, a border-out area BO, and a empty area EP are formed on the DVD-R 1 in accordance with this order from the inner radius side.

In the lead-in area LI, start information as control information necessary to start reproducing the recording information recorded on the whole DVD-R 1 is recorded.

In the file system area FS, file system information indicative of a hierarchical structure of the reproduction control information recorded in the reproduction control information area NV is recorded.

In the reproduction control information area NV, the reproduction control information indicative of a reproduction mode of the recording information recorded in the recording information area DT is recorded.

In the backup area BP, as backup information used in the case where the reproduction control information recorded in the reproduction control information area NV cannot be read for some reason (such as a blemish on the DVD-R 1), the same reproduction control information is recorded.

In the recording information area DT, the recording information recorded on the DVD-R 1 by the recording process of once is stored.

In the border-out area BO, temporary end information necessary to temporarily finish the recording of the recording information is recorded. That is, by the information, the recording of the whole DVD-R 1 is not finished but the recording operation is temporarily finished in a state where the empty area EP is left.

The area on the DVD-R 1 other than the above-described areas is left as it is as a empty area EP in which no information is recorded.

The recording format of the information recorded on the DVD-R 1 after the editing process of (seemingly) deleting a part of the recording information recorded on the DVD-R 1 in a state the recording process of once is finished is performed once will be described by referring to the right side of FIG. 1.

As shown in the right side of FIG. 1, after the deleting process is executed once, since the DVD-R 1 is of the write-once type, the start information in the lead-in area LI, file system information in the file system area FS, reproduction control information in the reproduction control information area NV, backup information in the backup area BP, and temporary end information in the border-out area BO remain the same without being changed.

Although there is no actual change in the recorded information in the recording information area DT, in new reproduction control information (that is, virtual reproduced recording information) is divided into, as shown on the right side of FIG. 1, first recording information stored in a first recording information area DT1, second recording information stored in a second recording information area DT2, and deletion information stored in a deletion information area NG (information which will not be reproduced after the deleting process).

In addition, after the deleting process, a border-in area BI, a file system area FS2, a reproduction control information area NV2, a backup area BP2, a border-out area BO2, and a empty area EP' are newly formed. A single border area BA is formed by the border-in area BI and the border-out area BO.

In the reproduction control information area NV2, out of the original recording information recorded in the recording information area DT, reproduction control information for preventing the deleted information stored in the deletion information area NG from being reproduced is recorded. In other words, the reproduction control information to make the information apparently deleted in the reproduction information after the deleting process is recorded.

In the border-in area BI, start information as control information necessary to start detecting reproduction control information in the reproduction control information area NV2 newly recorded is recorded.

In the file system area FS2, file system information indicative of a hierarchical structure or the like of new reproduction control information recorded in the reproduction control information area NV2 is recorded.

In the backup area BP2, in a manner similar to the backup area BP, as backup information used in the case where the reproduction control information recorded in the reproduction control information area NV2 cannot be read, the same reproduction control information is recorded.

In the border-out area BO2, in a manner similar to the border-out area BO, temporary end information necessary to temporarily finish the recording of the recording information after the deleting process is recorded.

The area on the DVD-R 1 other than the above-described areas is left as it is as a new empty area EP' in which no information is recorded.

As described above, in the DVD-R 1, it is necessary to re-record all the reproduction control information for controlling the reproduction mode of the whole recording information subjected to the deleting process including the reproduction control information for deleting a part or all of the original recording information before the deleting process. Consequently, even in the case of performing the deleting process in which no new information is recorded, the remaining capacity EP decreases gradually. The whole recording information denotes the first recording information stored in the first recording information area DT1, the second recording information stored in the second recording information area DT2, and the deletion information stored in the deletion information area NG.

The amount of the information recorded in each of the areas other than the recording information area DT is predetermined. Specifically, the amount of the start information in the border-in area BI is preset as 192 Kbytes (corresponding to 6 ECC (Error Correcting Code) blocks). The amount of each of the file system information in the file system information areas FS and FS2, the reproduction control information in each of the reproduction control information areas NV and NV2, and the backup information in each of the backup areas BP and BP2 is preset as about 512 Kbytes. As shown in FIG. 2, the amount of the information in the border area BA constructed by the border-in area BI and the border-out area BO is set in six ways in the range from about 6 Mbytes to about 96 Mbytes depending on the position in which the border area BA is formed on the DVD-R 1 and depending whether the border area is formed first or not. The formation position in FIG. 2 is shown by using the position on the DVD-R 1 expressed in hexadecimal notation. The ECC block in the display of an information amount denotes a block as an error correction unit in an error correcting process executed at the time of reproducing the recorded information.

II. Embodiment of Information Recording/Reproducing Apparatus

The configuration of the information recording/reproducing apparatus according to the embodiment in which a process of recording the information and a process of reproducing the recorded information are executed will be described by referring to FIGS. 3 to 8.

Figure 3:
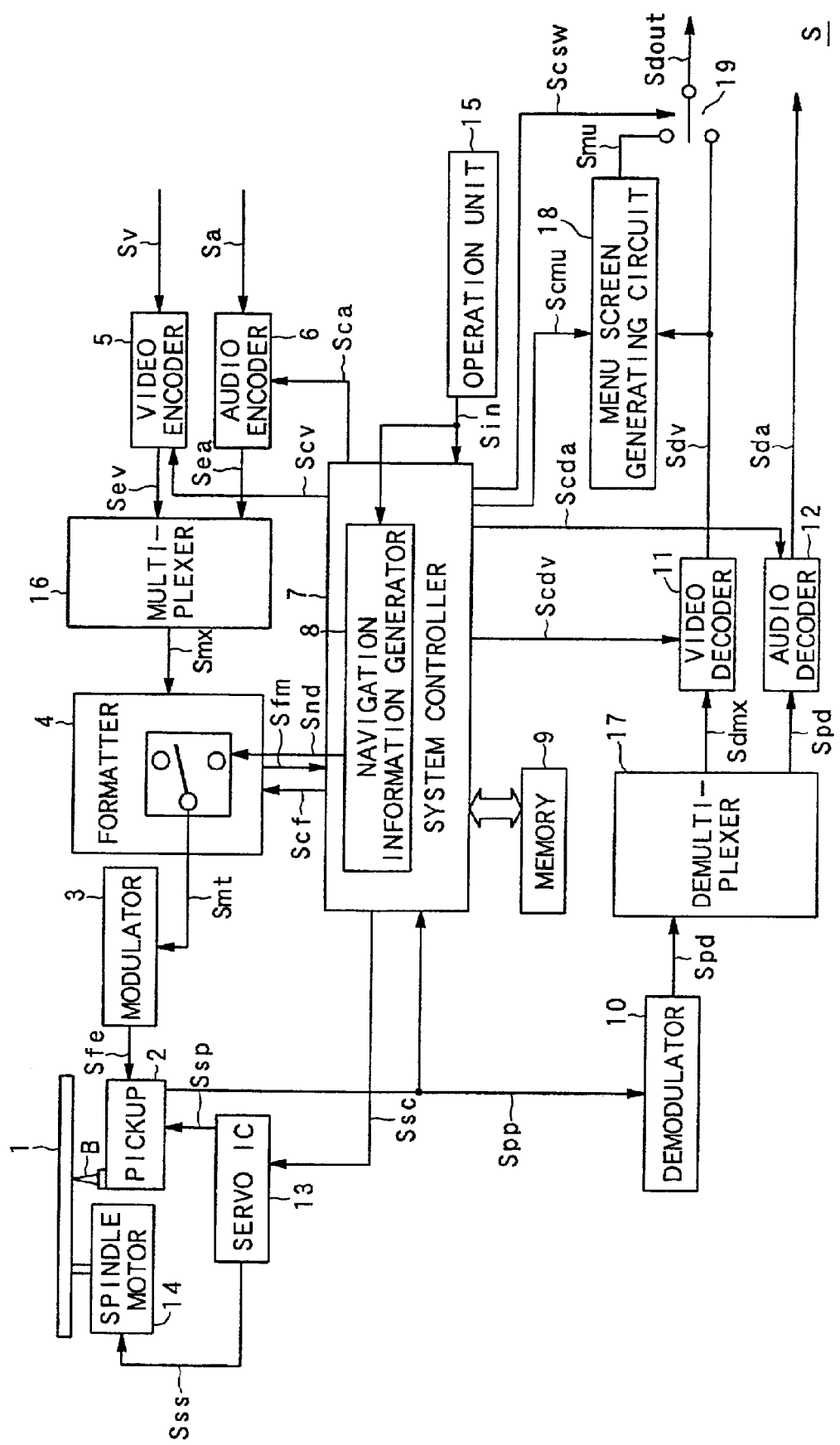
FIG. 3 is a block diagram showing a schematic configuration of an information recording/reproducing apparatus of an embodiment of the present invention.
Figure 4:
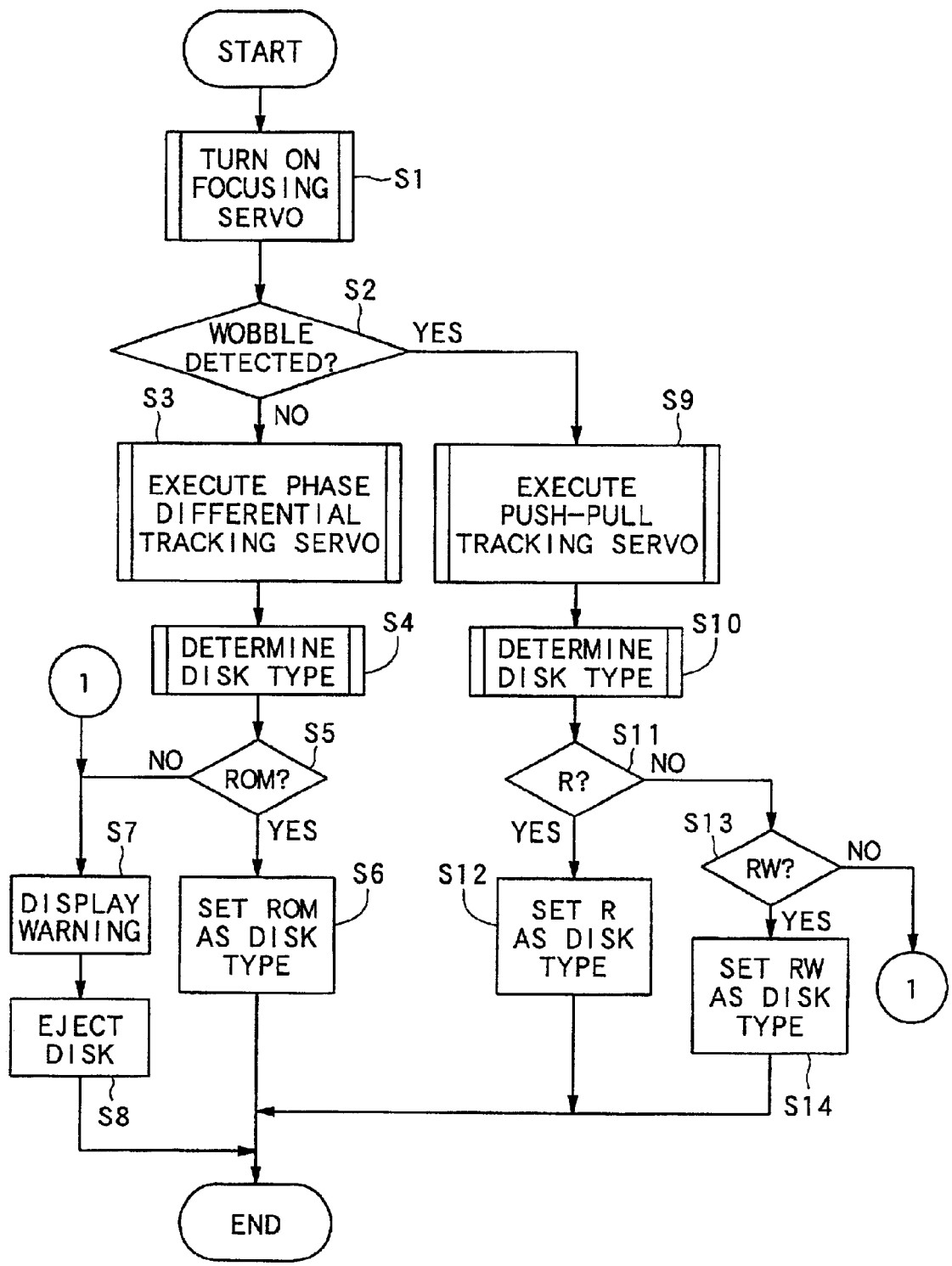
FIG. 4 is a flowchart (I) of an editing process of the embodiment.
Figure 5:
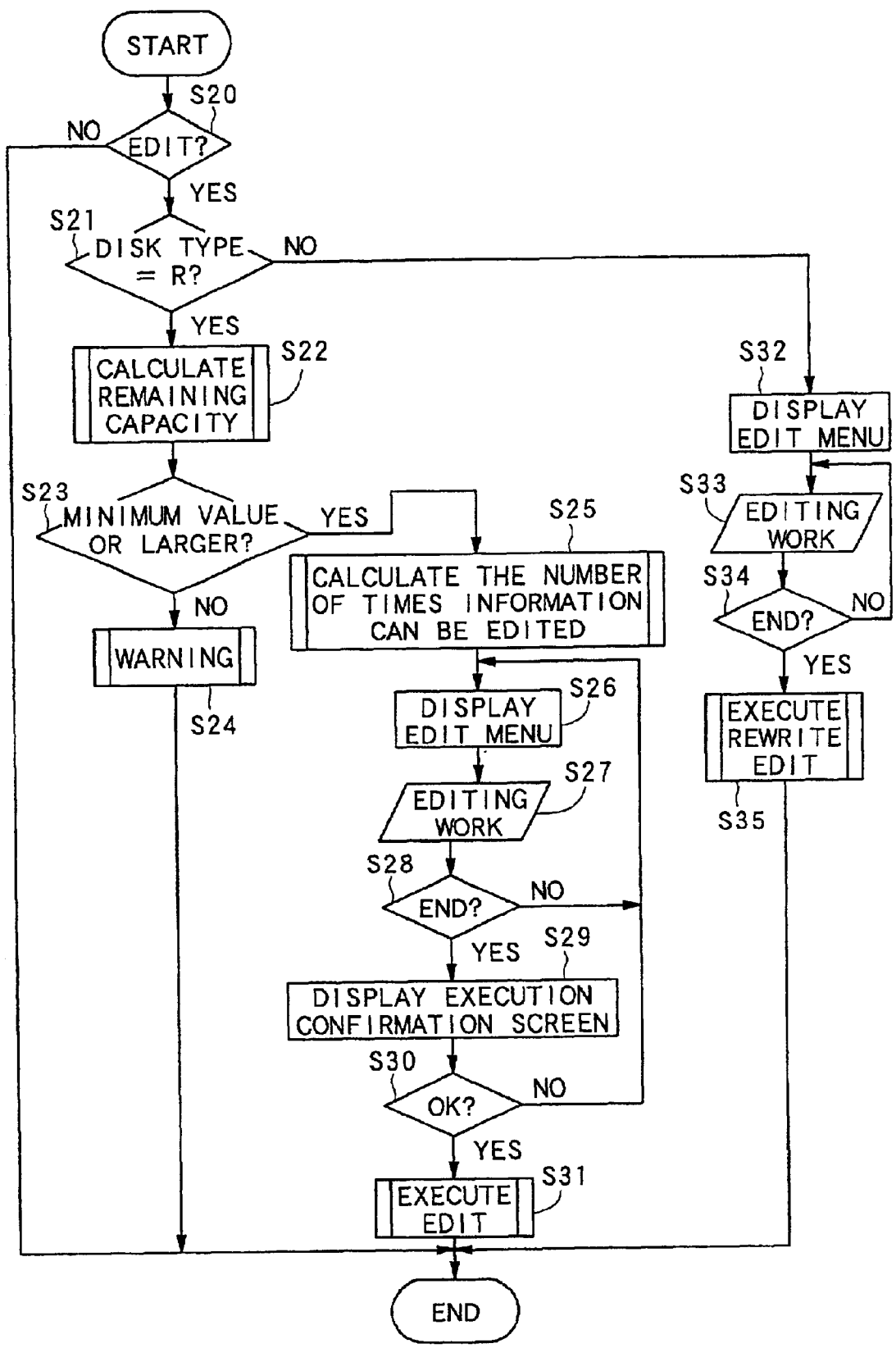
FIG. 5 is a flowchart (II) of an editing process of the embodiment.

FIG. 3 is a block diagram showing a schematic configuration of the information recording/reproducing apparatus. Each of FIGS. 4 and 5 is a flowchart of the editing process of the embodiment. Each of FIGS. 6A and 6B to 8A and 8B is a diagram showing an example of a setup screen or the like displayed in association with the editing process.

As shown in FIG. 3, an information recording/reproducing apparatus S according to the embodiment has a pickup 2, a modulator 3, a formatter 4, a video encoder 5, an audio encoder 6, a system controller 7 as a remaining capacity detecting device, a determining device, and a notifying device, a memory 9, a demodulator 10, a video decoder 11, an audio decoder 12, a servo IC (Integrated Circuit) 13, a spindle motor 14, an operation unit 15, a multiplexer 16, a demultiplexer 17, a menu screen generating circuit 18, and a switch 19.

The system controller 7 has a navigation information generator 8.

The schematic operation of each of the components will now be described.

First, an operation of recording video information or audio information input from the outside onto the DVD-R 1 loaded in the information recording/reproducing apparatus S will be described.

In the recording operation, the spindle motor 14 rotates the DVD-R 1 at preset rotational speed on the basis of a spindle control signal Sss sent from the servo IC 13.

Video information Sv as recording information to be recorded onto the DVD-R 1 is input from the outside and entered to the video encoder 5.

The video encoder 5 performs a preset encoding process, to be specific, for example, an MPEG (Moving Picture Experts Group) compression coding process on the video information Sv on the basis of a control signal Scv from the system controller 7 to thereby generate an encoded video signal Sev and outputs the encoded video signal Sev to the multiplexer 11.

Audio information Sa as recording information to be recorded on the DVD-R 1 is input from the outside and then entered to the audio encoder 6.

The audio encoder 6 performs a preset encoding process, to be specific, for example, the MPEG compression coding process on the audio information Sa on the basis of a control signal Sca from the system controller 7 to thereby generate an encoded audio signal Sea, and outputs the encoded audio signal Sea to the multiplexer 11.

The multiplexer 11 multiplexes image information and sound information, which is included in the encoded video signal Sev, by a preset process to thereby generate a multiplex signal Smx and outputs the multiplex signal Smx to the formatter 4.

The multiplexer 11 allows the encoded audio signal Sea to pass and to be used as the multiplex signal Smx.

The formatter 4 combines a navigation information signal Snd (navigation information signal Snd including the reproduction control information) from the navigation information generator 8 which will be described later and the multiplex signal Smx on the basis of a control signal Scf from the system controller 7 to thereby generate a format signal Smt and outputs the format signal Smt to the modulator 3.

The recording information supplied as the multiplex signal Smx to the formatter 4 is output as a recording information signal Sfm to the system controller 7 at a preset timing so as to be used to generate the reproduction control information (hereinafter, also properly called navigation information) in the navigation information generator 8.

The modulator 3 performs a preset modulating process, for example, what is called 8–16 modulating process on the format signal Smt to thereby generate a modulation signal Sfe and outputs the modulation signal Sfe to the pickup 2.

The pickup 2 generates a light beam B of which intensity is modulated by the modulation signal Sfe, and an information track in an information recording face (not shown) of the DVD-R 1 is irradiated with the light beam B, thereby generating a pit, which corresponds to the navigation information and each of the recording information included in the modulation signal Sfe, on the information track, and recording the navigation information and the recording information in a physical format preset for the DVD-R onto the DVD-R 1. The navigation information includes backup information related to the navigation information, file system information, and temporary end information.

A deviation in the direction perpendicular to the information recording face and in the horizontal direction between a condensing position of the light beam B and the information track is solved by moving a not-illustrated objective lens (objective lens for condensing the light beam B) in the pickup 2 in the above-described perpendicular direction and horizontal direction on the basis of a pickup servo signal Ssp outputted from the servo IC 13. That is, focusing servo control and tracking servo control are executed.

The servo IC 13 generates the spindle control signal Sss and the pickup servo signal Ssp on the basis of a control signal Ssc from the system controller 7 and outputs the spindle control signal Sss and the pickup servo signal Ssp to the spindle motor 14 and the pickup 2, respectively.

When an operation for executing the recording process in the information recording/reproducing apparatus S is performed by the user, the operation unit 15 generates an operation signal Sin corresponding to the operation and outputs the signal to the system controller 7.

The navigation information generator 8 generates the navigation information signal Snd including the navigation information to be recorded on the DVD-R 1 under the control of the system controller 7 on the basis of the operation signal Sin and the recording information signal Sfm and outputs the navigation information signal Snd to one of the input terminals of the formatter 4.

The recording information in the multiplex signal Smx and the navigation information in the navigation information signal Snd are multiplexed by the formatter 4, and the format signal Smt including the recording information in the above-described physical format is generated.

The operation of reproducing the recording information and the like already recorded on the DVD-R 1 on the basis of the navigation information also recorded will now be described.

In the reproducing operation, the switch 19 is switched to the video decoder 11 side on the basis of a control signal Scsw from the system controller 19.

In the reproducing operation, first, the pickup 2 generates the light beam B for reproduction having a predetermined intensity, and the information track on which the pit is formed is irradiated with the light beam B. On the basis of reflection light of the light beam B, a detection signal Spp corresponding to the recording information and navigation information is generated, and outputted to the demodulator 10 and the system controller 7.

The demodulator 10 performs a demodulating process corresponding to the modulating process in the modulator 3 onto the detection signal Spp to thereby generate a demodulated signal Spd and outputs the demodulated signal Spd to the demultiplexer 17.

When the demodulate signal Spd includes video information, the demultiplexer 17 demultiplexes the video information into the image information and sound information included in the video information to thereby generate a demultiplex signal Sdmx, and outputs the demultiplex signal Sdmx to the video decoder 11.

When a demodulated signal Spd includes audio information, the demultiplexer 17 passes the demodulated signal Spd as it is and outputs the signal to the audio decoder 12.

The video decoder 11 performs a decoding process corresponding to the encoding process by the video encoder 5 onto the demultiplex signal Sdmx on the basis of a control signal Scdv from the system controller 7 to generate a decoded video signal Sdv, and outputs the signal as a video output signal Sdout via the switch 19 to an external monitor (not shown) or the like.

The audio decoder 12 performs a decoding process corresponding to the encoding process in the audio encoder 6 onto the demodulated signal Spd including the audio information on the basis of a control signal Scda from the system controller 7 to generate a decoded audio signal Sda, and outputs the decode audio signal Sda to an external amplifier (not shown) on the outside or the like.

The deviation in the direction perpendicular to the information recording face and the horizontal direction between the condensed position of the light beam B and the information track is solved by the focusing servo control and the tracking servo control based on the pickup servo signal Ssp output from the servo IC 13 in a manner similar to the recording process.

To reproduce the recording information in a reproduction mode indicated by the navigation information on the basis of the operation signal Sin corresponding to the operation for executing the reproducing process executed in the operation unit 15 and the navigation information included in the detection signal Spp, the system controller 7 generates the control signal Ssc so as to control the irradiation position on the DVD-R 1 of the light beam B for reproduction emitted from the pickup 2, outputs the control signal Ssc to the servo IC 13, generates the control signals Scdv and Scda, and outputs the control signals Scdv and Scda to the video decoder 11 and the audio decoder 12, respectively.

Consequently, the recording information is reproduced in accordance with the reproduction order, reproduction time, or the like indicated by the navigation information.

An operation of executing the deleting process of deleting a part of the recording information already recorded on the DVD-R 1 will now be described.

In the case where the deleting process is executed, the switch 19 is switched to the menu screen generating circuit 18 side on the basis of the control signal Scsw from the system controller 7.

The menu screen generating circuit 18 generates a menu screen (setup screen) for setting deletion, which will be described later, by using the decoded video signal Sdv on the basis of a control signal Scmu from the system controller 7, and outputs the screen as a screen signal Smu to the not-illustrated monitor or the like via the switch 19.

After that, when the name of recording information to be deleted according to the menu screen, the deletion range, or the like is input from the operation unit 15, the navigation information generator 8 generates new navigation information having the contents for preventing a part of the recording information to be deleted from being reproduced in a reproducing process after that in correspondence with information input from the operation unit 15, generates the navigation information signal Snd including the navigation information, and records the new navigation information, backup information related to the navigation information, file system information, temporary end information, and the like in the empty area of the DVD-R 1 via the formatter 4, modulator 3, and pickup 2.

In parallel with the operations, while transmitting/receiving necessary information as a memory signal Sm to/from the memory 9, the system controller 7 generates the control signals Scv, Sca, Scf, Ssc, Scdv, Scsw, Scmu, and Scda for controlling the operations and outputs the control signals to the corresponding component members.

The detailed operation of executing the editing process as the above-described deleting process will be described by referring to FIG. 1 and FIGS. 4 to 8.

As shown in FIG. 4, in the editing process, first, the focusing servo control on the light beam B is turned on under the control of the servo IC 13 (step S1).

In a state where the focusing servo control is ON, on the basis of reflection light of the light beam B, whether a wobble occurs in an information track or not on the optical disk loaded in the information recording/reproducing apparatus S at present is detected (step S2).

Generally, the information track in a reproduction only DVD does not wobble. On the other hand, in a DVD-R (DVD-recordable) and DVD-RW (DVD-Re-Recordable; DVD on which information can be recorded plural times), the information track wobbles so that a clock signal as a reference at the time of recording is extracted or the like.

In determination of step S2, when no wobble on the information track is detected (step S2; NO), while executing phase difference method tracking servo control adapted to an information track which is not wobbling, the lead-in area of the loaded optical disk is irradiated with the light beam B (step S3). On the basis of the information obtained from the area, the type of the optical disk is determined. Specifically, whether the optical disk is the play-only DVD, DVD-R, or DVD-RW is determined (steps S4 and S5).

When it is determined in step S5 that the loaded optical disk is a play-only DVD, that is, either a DVD-ROM (DVD-Read Only Memory) on which data information for a computer or the like is recorded or a play-only DVD on which a movie or the like is recorded (step S5; YES), a flag indicating that the optical disk is a play-only DVD is set in the system controller 7 (step S6), the apparatus enters a standby mode.

On the other hand, when it is determined in step S5 that the loaded optical disk is not a play-only DVD (step S5; NO), since the state in which the information track is not wobbling (step S2; NO) and the type of the optical disk is not the play-only DVD (step S5; NO) is impossible, a warning of occurrence of an abnormal state such that a deformed optical disk or an optical disk which has a large blemish and cannot be reproduced is loaded is given to the user (step S7). The optical disk is ejected to the outside of the information recording/reproducing apparatus S (step S8) and the apparatus enters a standby mode.

When it is determined in step S2 that a wobble is detected on the information track (step S2; YES), while executing a push-pull tracking servo control adapted to the wobbling information track, the lead-in area of the loaded optical disk is irradiated with the light beam B (step S9), and the type of the optical disk is determined on the basis of information obtained from the area (steps S10 and S11).

When it is determined in step S11 that the loaded optical disk is the DVD-R 1 (step S11; YES), a flag indicating that the optical disk is the DVD-R 1 is set in the system controller 7 (step S12), and the apparatus enters a standby mode.

When it is determined in step S11 that the loaded optical disk is not the DVD-R 1 (step S11; NO), whether the optical disk is the DVD-RW or not is determined (step S13). When the loaded optical disk is the DVD-RW (step S13; YES), a flag in the system controller 7 indicating that the optical disk is the DVD-RW is set (step S14), and the apparatus enters the standby mode.

When it is determined in step S13 that the loaded optical disk is not the DVD-RW (step S13; NO), since the state in which the information track is wobbling (step S2; YES) and the type of the optical disk is not the DVD-R 1 or the DVD-RW (step S13; NO) is impossible, a warning that the abnormal state is detected is given to the user (step S7). The optical disk is ejected to the outside of the information recording/reproducing apparatus S (step S8) and the apparatus enters a standby mode.

The details of an actual editing process executed after the type determining process or the like shown in FIG. 4 is executed and the apparatus enters the standby mode will be described by referring to FIG. 5.

In the editing process, first, whether an instruction of executing the editing process is executed in the operation unit 15 or not is determined (step S20). If the editing process is not executed (step S20; NO), the process is finished. If the editing process is executed (step S20; YES), whether the optical disk loaded in the information recording/reproducing apparatus S at present is the DVD-R 1 or not is determined by referring to the flag in the system controller 7 (step S21).

When the optical disk is not the DVD-R 1 (step S21; NO), it is determined that the optical disk is an editable DVD except for the DVD-R 1, that is, the DVD-RW. An edit menu for the DVD-RW is generated by the menu generating circuit 18 and displayed on the monitor (not shown) or the like (step S32).

Figure 6A:
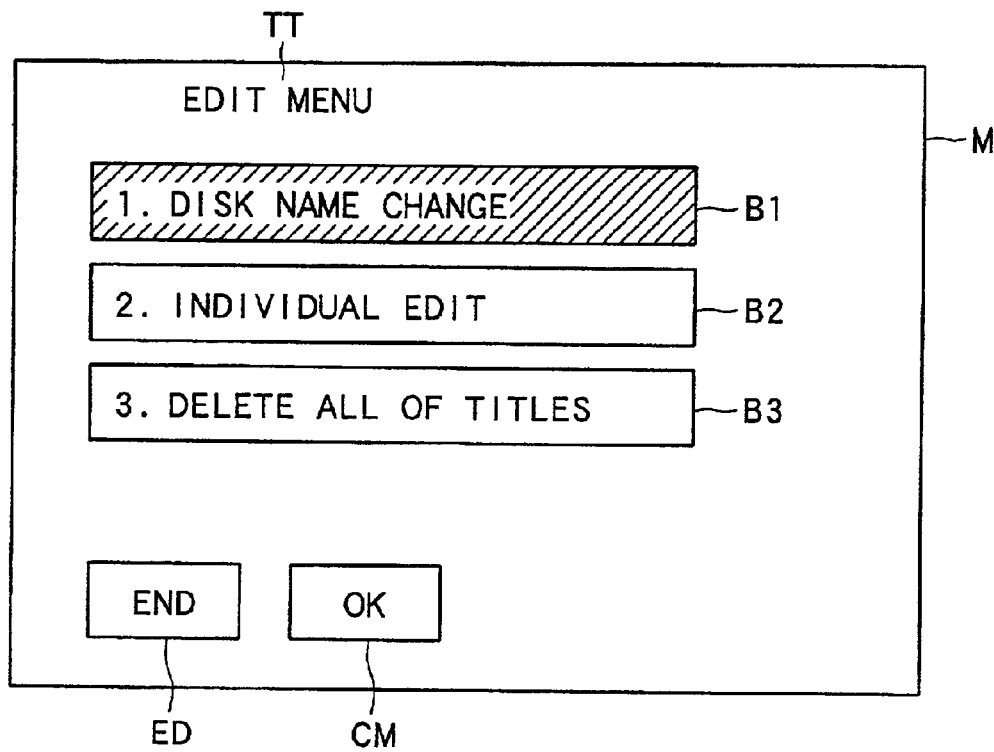
FIG. 6A is a diagram showing concrete example (I) of a setup screen of an edit menu.

FIG. 6A shows an example of the edit menu displayed on the monitor or the like. The edit menu M includes a title TT of the edit menu, a button B1 to be operated to change the name of the currently loaded DVD-RW itself, a button B2 to be operated to edit each recording information (hereinafter, the recording information is called a title) recorded in the DVD-RW, a button B3 operated at the time of erasing all the titles recorded in the DVD-RW, an end button ED operated at the time of finishing the editing process, and a decision button CM operated to determine (execute) the operated process.

After the edit menu M is displayed, an actual editing process using the edit menu M is executed (step S33), and whether the operation of finishing the editing process is executed by the operation unit 15 or not is determined (step S34).

When the editing process is not finished (step S34; NO), the processing of the embodiment returns to step S33 and the editing process is continued. On the other hand, when the operation of finishing the editing process is performed (step S34; YES), a process of rewriting the contents of the DVD-RW with the edited recording information and the navigation information (including corresponding file system information) corresponding to the recording information is executed (step S35), and the process is finished.

When it is determined in step S21 that the optical disk loaded in the information recording/reproducing apparatus S is the DVD-R 1 (step S21; YES), the amount of information in the current empty area (refer to the reference characters EP in FIG. 1) in the DVD-R 1 is calculated on the basis of the file system information recorded in the DVD-R 1 and the like (step S22) and, further, whether the value of the calculated information amount is equal to or larger than a preset minimum value or not is determined (step S23).

The minimum value in step S23 is equal to a total value of new navigation information (512 Kbytes), file system information (512 Kbytes), backup information (512 Kbytes), temporary end information and start information to be recorded in the border-in area BI (6 to 96 Mbytes as a total of the temporary end information and the start information) generated by the editing process of once and to be added. That is, the minimum value is changing from about 7.5 Mbytes to about 97.5 Mbytes depending on the formation position of the border area BA and depending on whether the border area BA is formed for the first time. When a empty area EP less than the minimum value remains in the DVD-R 1, the minimum value denotes an information amount of the empty area in which the editing process cannot be performed in the DVD-R 1.

When it is determined in step S23 that the information amount of the empty area EP is equal to or larger than the minimum value (step S23; YES), the editing process of once or more can be performed, so that the specific number of times the editing process can be performed is calculated (step S25).

The number of times the editing process can be performed is calculated in step S25 by dividing the information amount of the empty area EP calculated in step S22 by the minimum value (about 7.5 Mbytes to 97.5 Mbytes) while considering the formation position of the border area BA.

After calculating the specific number of times the editing process can be performed, the edit menu for the DVD-R 1 including the calculated number of times the editing process can be performed is generated by the menu generating circuit 18 and displayed on the not-illustrated monitor or the like (step S26).

Figure 6B:
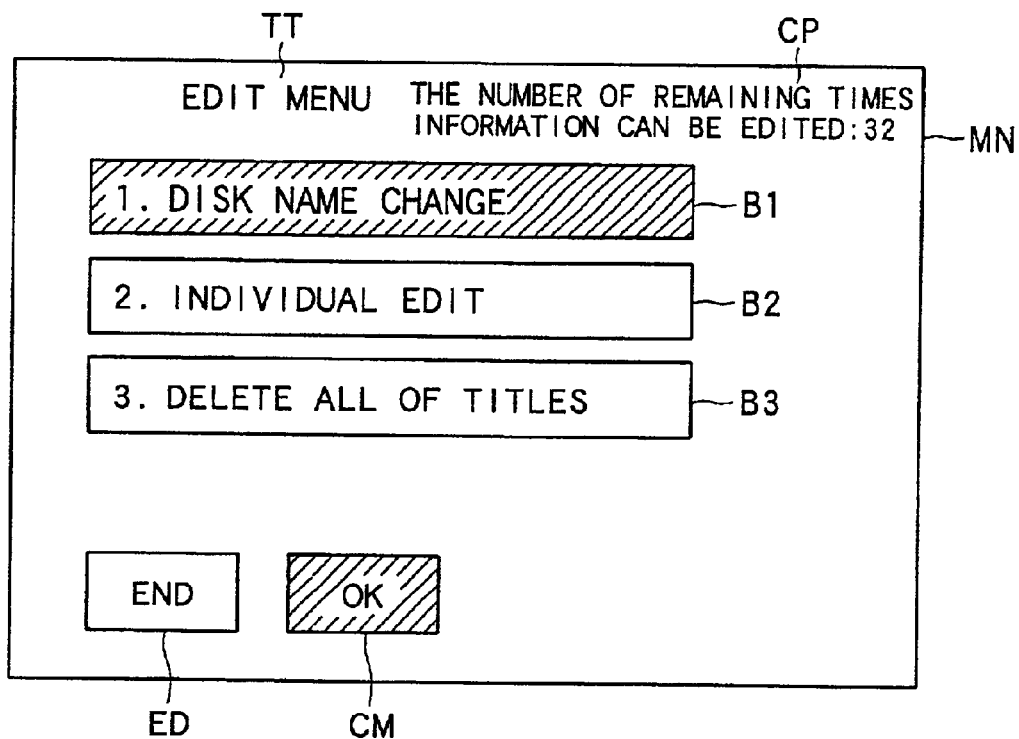
FIG. 6B is a diagram showing concrete example (I) of a setup screen of an edit menu with indication of the number of times information can be edited.

As the edit menu displayed on the monitor or the like, for example as shown in FIG. 6B, an edit menu MN including not only the configuration of the edit menu M shown in FIG. 6A but also the number of times CP the editing process can be performed indicative of the number of times the editing process can be performed calculated in step S25 is displayed.

After the edit menu MN is displayed, the editing process according to the edit menu MN is executed (step S27). By the editing process, the corresponding new start information, file system information, navigation information, backup information, and temporary end information are generated and temporarily stored in a not-illustrated memory in the system controller 7.

Figure 7A:
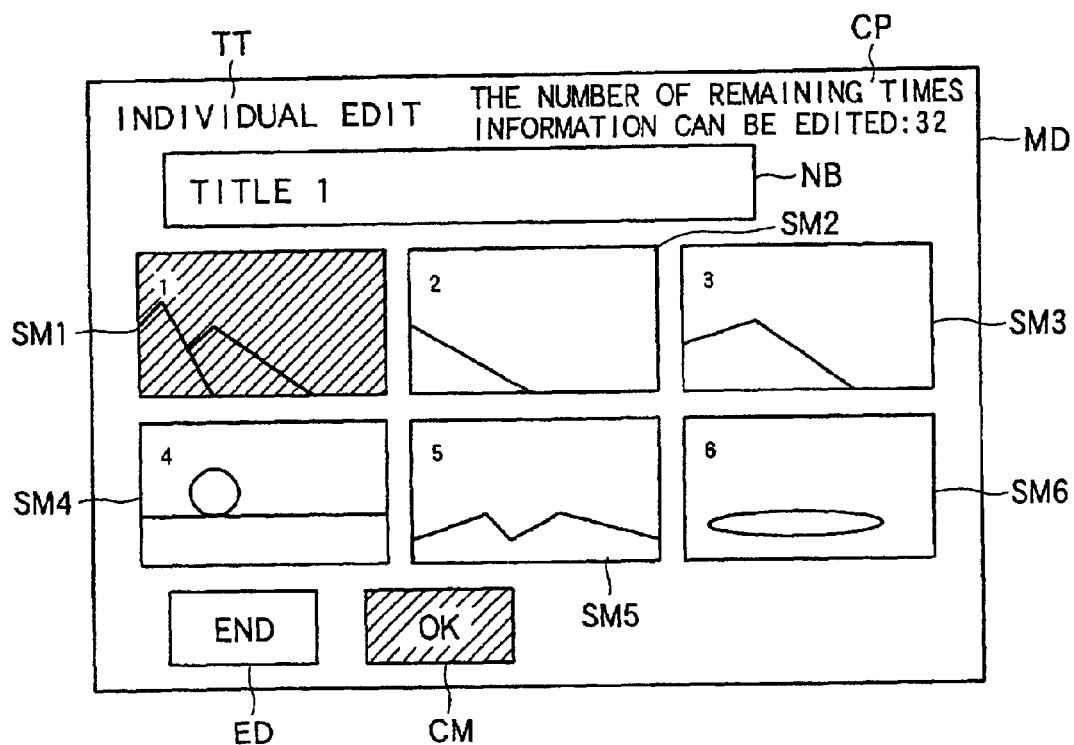
FIG. 7A is a diagram showing a concrete example (II) of a setup screen of individual edit screens.

The concrete flow of the editing process in step S27 in the case where the button B2 is operated in the edit menu MN displayed in step S26 will be described as an example. First, a corresponding individual edit screen MD as shown in FIG. 7A is generated by the menu generating circuit 18 and displayed.

The individual edit screen MD includes a title TT, the number of times CP the editing process can be performed, representative image displays SM1 to SM6 (in the case where the total number of the titles is "6") displaying representative images (what is called thumbnail images) each having the title recorded in the DVD-R 1 at present, selection number indication NB in which the number of the selected title is displayed, the end button ED operated to finish the title selection, and the decision button CM operated to finally determine the title selection.

For example, when the title 1 is selected on the individual edit screen MD (refer to FIG. 7A), an edit menu MM indicative of the contents of the individual editing process is generated by the menu generating circuit 18 and displayed.

Figure 7B:
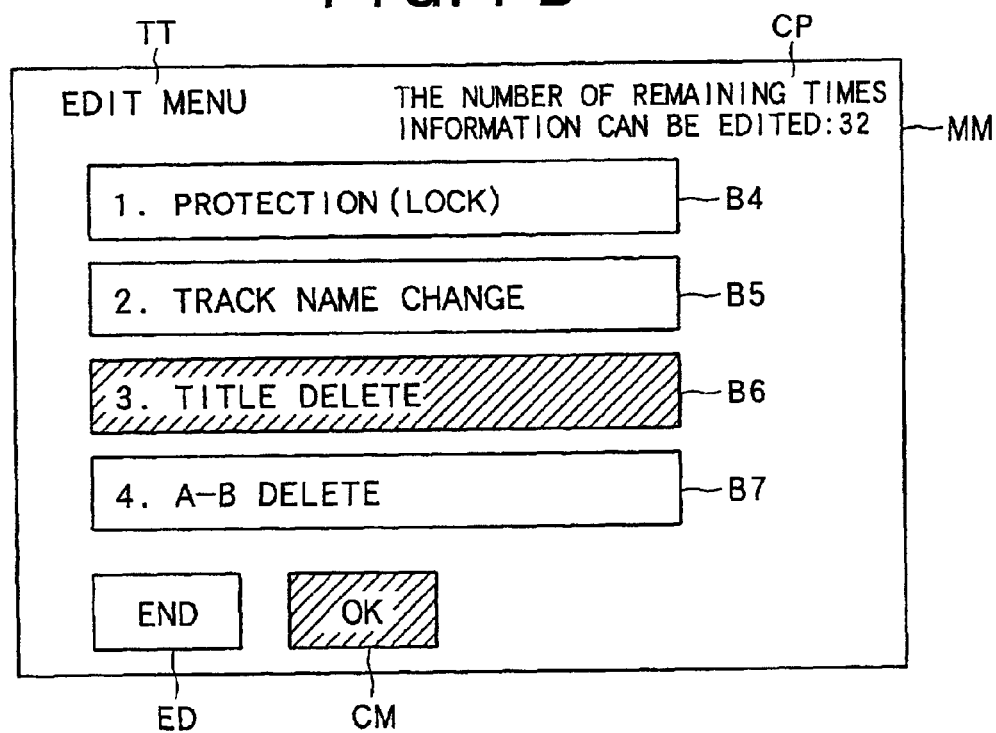
FIG. 7B is a diagram showing a concrete example (II) of a setup screen of an edit menu of individual edit.

In this case, as shown in FIG. 7B, the edit menu MM includes the title TT, the number of times CP the editing process can be performed, a button B4 operated to disable a future editing process of the selected title, a button B5 operated to change the name of the selected title, a button B6 operated to delete (erase) the selected title from the DVD-R 1 (that is, to disable reproduction), a button B7 operated to delete a part in the selected title (in the case shown in FIG. 7B, a portion from the point A (start point) to the point B (end point) in the selected title), the end button ED operated to finish the editing process, and the decision button CM operated to finally determine the contents of the editing process.

Figure 8A:
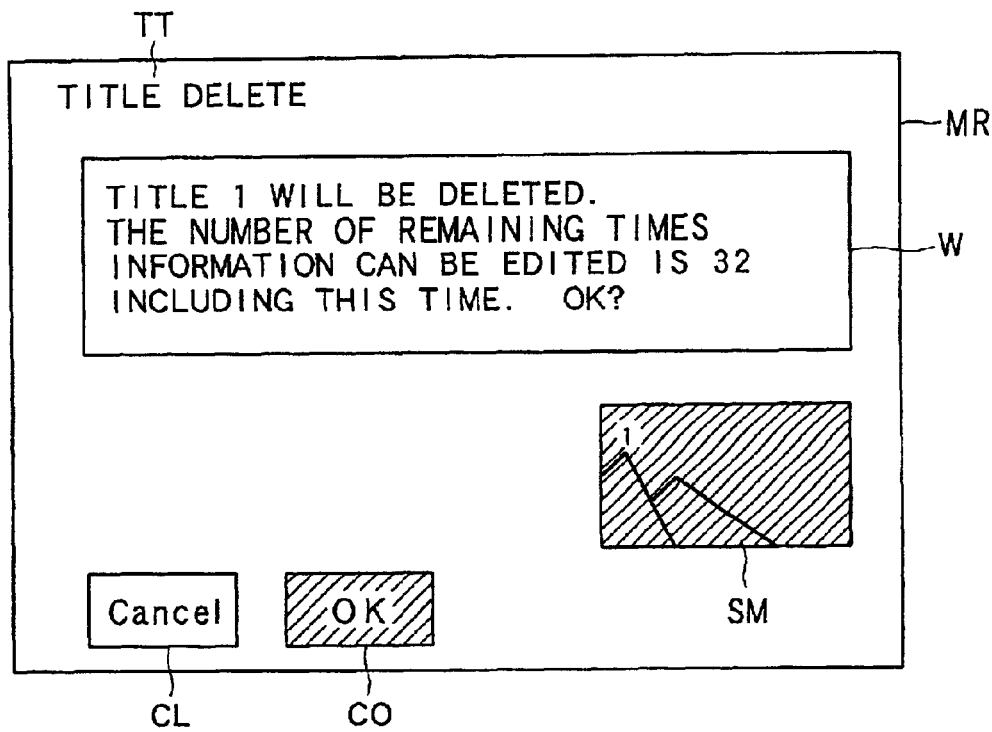
FIG. 8A is a diagram showing a concrete example (III) of a setup screen of an execution confirmation screen.

The decision button CM in the edit menu MM is operated to determine whether the editing process is finished or not (step S28). When the decision button CM is not operated (step S28; NO), the editing process is continuously executed. Consequently, the processing of the embodiment returns to the step S26. On the other hand, when the decision button CM is operated (step S28; YES), to confirm whether the editing process is finally executed or not (in other words, whether new navigation information or the like is generated and additionally recorded on the DVD-R 1 or not), an editing process execution confirmation screen MR as shown in FIG. 8A is generated by the menu generating circuit 18 and displayed (step S29).

The execution confirmation screen MR includes the title TT, confirmation indication W for confirming deletion of the selected title and indicating the number of times the editing process can be performed after that, a representative image display SM for displaying a representative image of the title to be deleted, a cancellation button CL operated to cancel the editing process, and a confirmation button CO operated to execute the editing process.

When the execution confirmation screen MR is displayed, whether the confirmation button CO in the execution confirmation screen MR is operated or not is determined (step S30). When the confirmation button CO is not operated (step S30; NO), the processing of the embodiment returns to step S26 to execute the editing process again. On the other hand, when the confirmation button CO is operated (step S30; YES), to execute the editing process, the start information in the border-in area BI, file system information, navigation information, backup information, and temporary end information which are generated and stored in step S27 as a result of the editing process is read and recorded to the empty area. For example, as shown in the right side of FIG. 1, the border-in area BI, file system area FS2, reproduction control information area NV2, backup area BP2, and border-out area BO2 are generated (step S31), and the series of editing processes is finished.

Figure 8B:
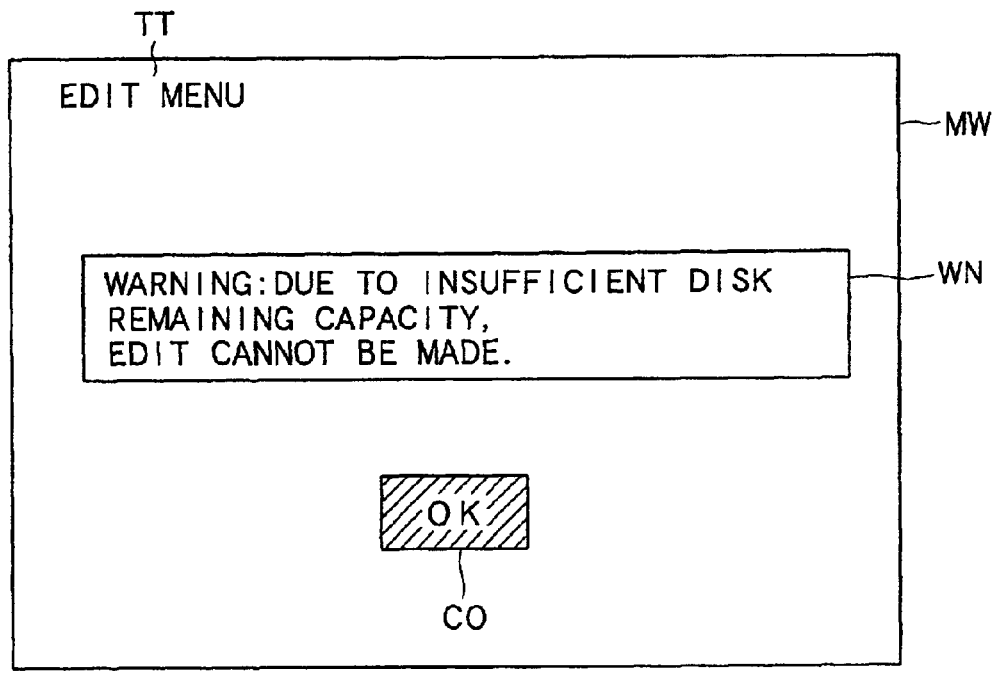
FIG. 8B is a diagram showing a concrete example (III) of a setup screen of a warning screen.

When it is determined in step S23 that the information amount of the empty area EP is less than the minimum value (step S23; NO), the editing process cannot be performed even once. Consequently, a warning screen MW as shown in FIG. 8B is generated by the menu generating circuit 18 and displayed on the not-illustrated monitor or the like (step S24), and the process is finished.

The warning screen MW includes the title TT, warning indication WN indicating that the editing process cannot be performed due to an insufficient information amount in the empty area EP, and a confirmation button CO operated when the user understands the warning indication WN.

By the display of the warning screen MW, the user recognizes that the editing process cannot be executed even if it is the deleting process due to an insufficient information amount of the empty area EP of the DVD-R 1.

As described above, according to the editing process in the information recording/reproducing apparatus S of the embodiment, whether the editing process can be performed on the information recorded on the DVD-R 1 or not is displayed. Thus, the user can recognize the state before actually executing the editing process.

As the number of times the editing process can be performed on the recording information is determined and the determined number is displayed, the user can recognize the specific number of times the editing process can be performed before actually executing the editing process.

Further, since the editing process is to delete all or a part of the information recorded on the DVD-R 1, prior to execution of deleting a part or all of the recorded information, whether the information can be deleted or not can be recognized.

III. Modifications of Information Recording/Reproducing Apparatus

Modifications according to the invention will now be described by referring to FIGS. 9 and 10.

Figure 9:
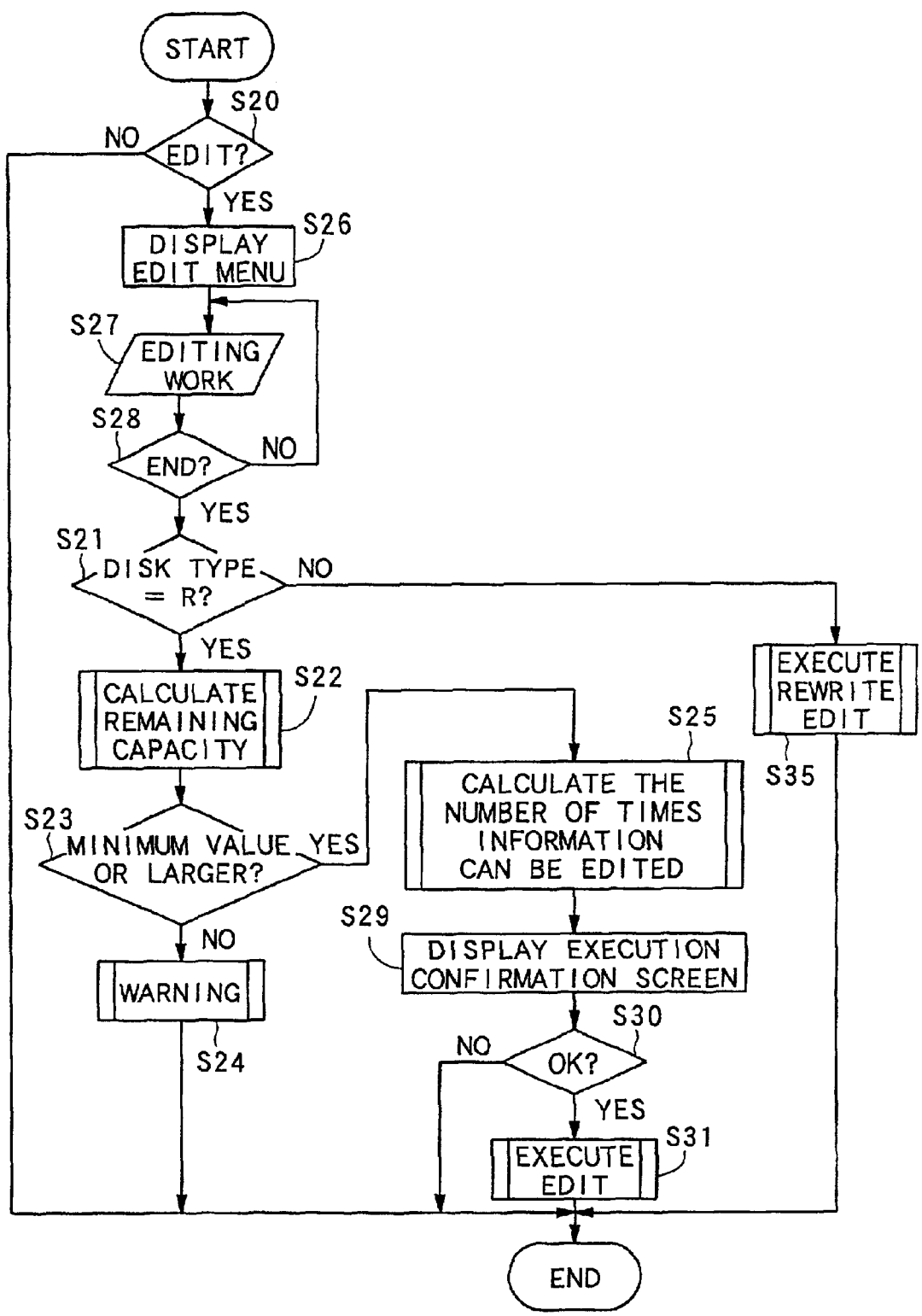
FIG. 9 is a flowchart showing an editing process of a first modification of the invention.
Figure 10:
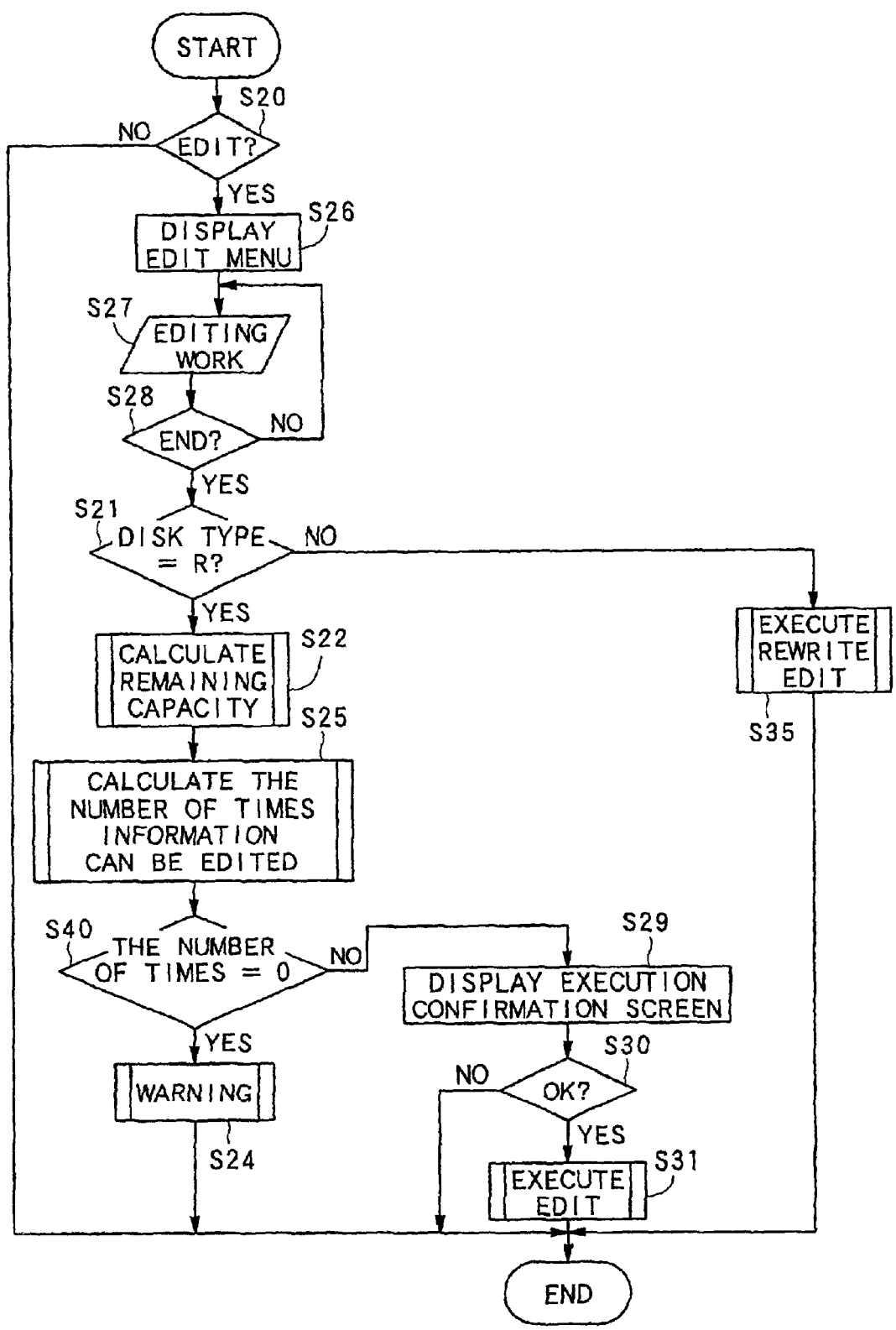
FIG. 10 is a flowchart showing an editing process of a second modification of the invention.

Each of FIGS. 9 and 10 is a flowchart showing the editing process of each of modifications. The same processes as those in the flowchart showing the editing process of the embodiment shown in FIG. 5 are6 designated by the same step numbers and the details will not be described.

First, the first modification will be described by referring to FIG. 9.

In the foregoing embodiment, the number of editing processes which can be performed after that is displayed to allow the user to confirm it (refer to step S25 in FIG. 5) and, after that, the actual editing process is executed (steps S26 to S31 in FIG. 5). Alternately, it is also possible to execute the editing process first and display the number of editing processes which can be performed immediately before recording new navigation information or the like to the DVD-R 1.

Specifically, as shown in FIG. 9, as the editing process of the first modification, first, the editing process is started (step S20; YES). The actual editing process using a not-illustrated memory in the system controller 7 is performed first (steps S26 to S28), and the type of the optical disk loaded in the information recording/reproducing apparatus S is determined (step S21).

When the type of the optical disk is the DVD-RW (step S21; NO), a rewrite editing process adapted to the DVD-RW is executed (step S35), and the process is finished.

When the optical disk is the DVD-R 1 (step S21; YES), the information amount of the empty area EP is calculated (step S22) and is compared with the minimum value (step S23).

The information amount of the empty area EP is less than the minimum value (step S23; NO), the warning screen MW (refer to FIG. 8B) is displayed (step S24), and the process is finished.

When the information amount of the empty area EP is equal to or larger than the minimum value (step S23; YES), the actual number of times the editing processes can be performed is calculated (step S25), and the execution confirmation screen MR (refer to FIG. 8A) is displayed (step S29). If the execution is confirmed (step S30; YES), the new navigation information or the like is recorded on the DVD-R 1 (step S31), and the process is finished.

By the editing process of the first modification as well, an effect similar to that of the foregoing embodiment can be produced.

A second modification will now be described by referring to FIG. 10.

The second modification described hereinafter is similar to the first modification with respect to the point that the editing process is executed first, and the number of times the editing process can be performed is displayed before the new navigation information or the like is recorded on the DVD-R 1 but is different from the first modification that the information amount is not compared with the minimum value.

As shown in FIG. 10, the editing process of the second modification is performed as follows. First, the editing process is started (step S20; YES), the actual editing process using the not-illustrated memory of the system controller 7 is performed first (steps S26 to S28), and the type of the optical disk loaded in the information recording/reproducing apparatus S is determined (step S21).

When the type of the optical disk is the DVD-RW (step S21; NO), a rewrite editing process adapted to the DVD-RW is executed (step S35), and the process is finished.

When the optical disk is the DVD-R 1 (step S21; YES), the information amount of the empty area EP is calculated (step S22), the actual number of times the editing process can be performed is calculated on the basis of the calculated information amount (step S25), and whether the number of times is equal to "0" or not is determined (step S40).

When the number of times is "0" (step S40; YES), the warning screen MW (refer to FIG. 8B) is displayed (step S24), and the process is finished.

When the number of times is not "0" (step S40; NO), the execution confirmation screen MR (refer to FIG. 8A) is displayed (step S29). When the execution is confirmed (step S30; YES), the new navigation information or the like is recorded on the DVD-R 1 (step S31), and the process is finished.

With respect to the execution confirmation screen MR displayed in step S29, the number of times the editing process can be performed calculated as shown in FIG. 8A (refer to step S25) may be displayed or may not be displayed.

In the editing process according to the second modification, an effect similar to the foregoing embodiment can be produced. In addition, not only the number of times the editing process can be performed but also whether the process of editing the recorded information can be performed or not can be determined and the result of determination is notified. Thus, before the execution of the actual editing process, the user can recognize whether the editing process can be performed or not.

In the foregoing embodiment and modifications, the message that the editing process cannot be performed is notified by displaying the warning screen MW on the not-illustrated monitor or the like. It is also possible to notify the message by, for example, sound.

In the foregoing embodiment and modifications, the case where the editing process is executed on information recorded on the DVD-R 1 has been described. The invention can be also applied to a process of deleting information recorded on a CD-R (CD-Recordable) as another write-once recording medium.

Further, in the foregoing embodiment and modifications, at the time of executing the editing process, all of the file system information, navigation information, and backup information (all the information including changed information and information which does not have to be changed) is additionally recorded. It is also possible to additionally record only a changed portion when the information is compared with the file system information, navigation information, and backup information before edit, as new file system information, navigation information, and backup information.

Further, it is also possible to record the program corresponding to the flowchart shown in FIGS. 4, 5, 9, or 10 on an information recording medium such as a flexible disk or hard disk, and read and execute the recorded program by a personal computer or a general CPU. In such a manner, the personal computer or the general CPU can function as the system controller 7.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-225960 filed on Jul. 26, 2000 including the specification, claims, drawings and summary is incorporated herein by reference in its entirety.

What is claimed is:

1. An information editing apparatus for editing recording information already recorded on a recording medium on which information can be recorded only once, comprising:
   a remaining capacity detecting device for detecting a remaining capacity as a recording capacity of an unrecorded area on said recording medium;
   a determining device for determining whether said recording information can be edited or not on the basis of said detected remaining capacity and an amount of information to be recorded in said unrecorded area by editing said recording information; and
   a notifying device for notifying a result of said determination.

2. The information editing apparatus according to claim 1, wherein said determining device determines the number of times said recording information can be edited after said determination, and
   said notifying device notifies said determined number of times.

3. The information editing apparatus according to claim 2, wherein editing of said recording information is deletion of all or a part of said recording information recorded on said recording medium.

4. The information editing apparatus according to claim 3, wherein said information to be recorded in said unrecorded area including reproduction control information for preventing said deleted recording information from being reproduced.

5. The information editing apparatus according to claim 1, wherein said determining device determines whether said recording information can be edited or not after said determination, and
   said notifying device notifies whether said recording information can be edited or not.

6. The information editing apparatus according to claim 5, wherein editing of said recording information is deletion of all or a part of said recording information recorded on said recording medium.

7. The information editing apparatus according to claim 6, wherein said information to be recorded in said unrecorded area including reproduction control information for preventing said deleted recording information from being reproduced.

8. The information editing apparatus according to claim 1, wherein editing of said recording information is deletion of all or a part of said recording information recorded on said recording medium.

9. The information editing apparatus according to claim 8, wherein said information to be recorded in said unrecorded area including reproduction control information for preventing said deleted recording information from being reproduced.

10. An information editing method of editing recording information already recorded on a recording medium on which information can be recorded only once, comprising:
    a remaining capacity detecting process of detecting a remaining capacity as a recording capacity of an unrecorded area on said recording medium;
    a determining process of determining whether said recording information can be edited or not on the basis of said detected remaining capacity and an amount of information to be recorded in said unrecorded area by editing said recording information; and
    a notifying process of notifying a result of said determination.

11. The information editing method according to claim 10, wherein the number of times said recording information can be edited after said determination is determined in said determining process, and
    said determined number of times is notified in said notifying process.

12. The information editing method according to claim 11, wherein editing of said recording information is deletion of all or a part of said recording information recorded on said recording medium.

13. The information editing method according to claim 12, wherein said information to be recorded in said unrecorded area including reproduction control information for preventing said deleted recording information from being reproduced.

14. The information editing method according to claim 10, wherein whether said recording information can be edited or not is determined after said determination in said determining process, and
    whether said recording information can be edited or not is notified in said notifying process.

15. The information editing method according to claim 14, wherein editing of said recording information is deletion of all or a part of said recording information recorded on said recording medium.

16. The information editing method according to claim 15, wherein said information to be recorded in said unrecorded area including reproduction control information for preventing said deleted recording information from being reproduced.

17. The information editing method according to claim 10, wherein editing of said recording information is deletion of all or a part of said recording information recorded on said recording medium.

18. The information editing method according to claim 17, wherein said information to be recorded in said unrecorded area including reproduction control information for preventing said deleted recording information from being reproduced.

19. An information recording medium on which a program for controlling an edit is recorded so as to be read by an editing computer included in an information editing apparatus of editing recording information already recorded on a recording medium on which information can be recorded only once, said program causing said editing computer to function as:
    a remaining capacity detecting device for detecting a remaining capacity as a recording capacity of an unrecorded area on said recording medium;
    a determining device for determining whether said recording information can be edited or not on the basis of said detected remaining capacity and an amount of information to be recorded in said unrecorded area by editing said recording information; and
    a notifying device for notifying a result of said determination.

20. The information recording medium according to claim 19, wherein said determining device determine the number of times said recording information can be edited after said determination, and said notifying device notifies said determined number of times.

21. The information recording medium according to claim 20, wherein editing of said recording information is deletion of all or a part of said recording information recorded on said recording medium.

22. The information recording medium according to claim 21, wherein said information to be recorded in said unrecorded area including reproduction control information for preventing said deleted recording information from being reproduced.

23. The information recording medium according to claim 19, wherein said determining device determines whether said recording information can be edited or not after said determination, and said notifying device notifies whether said recording information can be edited or not.

24. The information recording medium according to claim 23, wherein editing of said recording information is deletion of all or a part of said recording information recorded on said recording medium.

25. The information recording medium according to claim 24, wherein said information to be recorded in said unrecorded area including reproduction control information for preventing said deleted recording information from being reproduced.

26. The information recording medium according to claim 19, wherein editing of said recording information is deletion of all or a part of said recording information recorded on said recording medium.

27. The information recording medium according to claim 26, wherein said information to be recorded in said unrecorded area including reproduction control information for preventing said deleted recording information from being reproduced.

28. A computer data signal embodied in a carrier wave and representing a series of instructions which cause a computer to perform steps to execute an editing process in an information editing apparatus of editing recording information already recorded on a recording medium on which information can be recorded only once, said steps comprising:

a remaining capacity detecting step of detecting a remaining capacity as a recording capacity of an unrecorded area on said recording medium;

a determining step of determining whether said recording information can be edited or not on the basis of said detected remaining capacity and an amount of information to be recorded in said unrecorded area by editing said recording information; and a notifying step of notifying a result of said determination.

* * * * *